US007643795B2

(12) United States Patent
Friedrichs et al.

(10) Patent No.: US 7,643,795 B2
(45) Date of Patent: Jan. 5, 2010

(54) REMOTE-CONTROL VIBRATOR

(76) Inventors: Arno Friedrichs, Grünbaum 3, 95326 Kulmbach (DE); Bert Apitzsch, Güsselkoppel 34, 22339 Hamburg (DE)

(*) Notice: Subject to any disclaimer, the term of this patent is extended or adjusted under 35 U.S.C. 154(b) by 232 days.

(21) Appl. No.: 10/502,483

(22) PCT Filed: Jan. 23, 2003

(86) PCT No.: PCT/EP03/00621

§ 371 (c)(1),
(2), (4) Date: Jul. 23, 2004

(87) PCT Pub. No.: WO03/061548

PCT Pub. Date: Jul. 31, 2003

(65) Prior Publication Data

US 2005/0075072 A1 Apr. 7, 2005

(30) Foreign Application Priority Data

Jan. 26, 2002 (DE) ................................ 102 02 952

(51) Int. Cl.
*H04B 7/00* (2006.01)

(52) U.S. Cl. ................ 455/41.2; 455/426.1; 455/426.2; 455/556.1

(58) Field of Classification Search ................ 455/41.2, 455/426.1, 426.2, 556.1
See application file for complete search history.

(56) References Cited

U.S. PATENT DOCUMENTS 2,920,604 A * 1/1960 Mccausland et al. ..... 116/137 A
5,722,071 A * 2/1998 Berg et al. .................. 455/426
6,188,916 B1 * 2/2001 Noda et al. ................. 455/567
6,389,287 B1 * 5/2002 Smith et al. ................. 455/445
6,498,652 B1 * 12/2002 Varshneya et al. .......... 356/447
6,577,040 B2 * 6/2003 Nguyen ....................... 310/309
6,850,782 B2 * 2/2005 Bright et al. ................ 455/567
7,149,502 B2 * 12/2006 Fujisawa et al. ......... 455/414.1

FOREIGN PATENT DOCUMENTS

| | | |
|---|---|---|
| AT | 408608 | 1/2002 |
| DE | 201 10 298 | 11/2001 |
| DE | 10038271 | 2/2002 |

(Continued)

OTHER PUBLICATIONS

English translation of Japanese Office Action.

(Continued)

*Primary Examiner*—Nay A Maung
*Assistant Examiner*—Tuan H Nguyen
(74) *Attorney, Agent, or Firm*—Collard & Roe, P.C.

(57) ABSTRACT

The invention relates to a remotely controllable vibrator, which comprises a receiver interface, a microcontroller connected with the receiver interface and a resonator device controlled by the microcontroller. The receiver interface is a Bluetooth interface which is provided for a bidirectional wire-free signal transmission between the vibrator and an external Bluetooth apparatus. The vibrator is remotely controllable and remotely programmable by way of its Bluetooth interface. In addition, the invention relates to a device for remote control of a vibrator, comprising a vibrator, which is provided with a Bluetooth interface, and a second Bluetooth apparatus, wherein the second Bluetooth apparatus is provided for generating remote control signals and/or remote programming signals for the vibrator.

22 Claims, 1 Drawing Sheet

FOREIGN PATENT DOCUMENTS

| | | | | |
|---|---|---|---|---|
| DE | 202 02874 | | | 12/2002 |
| GB | 2 331 928 | | | 6/1999 |
| GB | 2 331 928 | | * | 9/1999 |
| JP | 2001 086257 | A | | 3/2001 |
| JP | 2001 326980 | A | | 11/2001 |
| WO | WO 9937267 | | | 7/1999 |

OTHER PUBLICATIONS

German translation of Japanese Office Action.

* cited by examiner

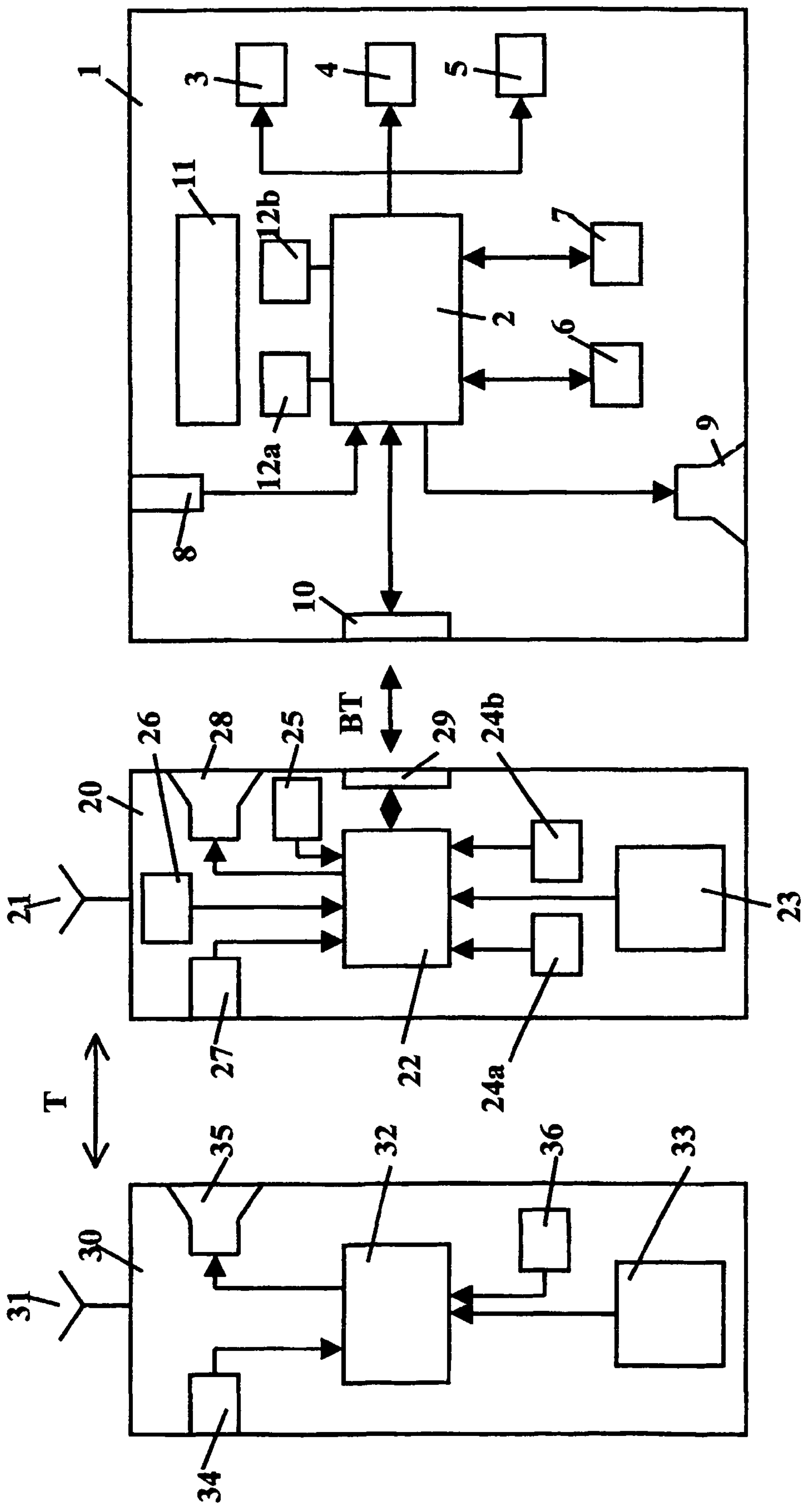
BT
T

REMOTE-CONTROL VIBRATOR

CROSS REFERENCE TO RELATED APPLICATIONS

Applicants claim priority under 35 U.S.C. §119 of German Application No. 102 02 952.0 filed on Jan. 26, 2002. Applicants also claim priority under 35 U.S.C. §365 of PCT/EP03/00621 filed on Jan. 23, 2003. The international application under PCT article 21(2) was not published in English.

BACKGROUND OF THE INVENTION

1. Field of the Invention

The invention relates to a remotely controllable vibrator, which comprises a receiver interface, a microcontroller connected with the receiver interface and a resonator device controlled by the microcontroller.

2. The Prior Art

A remotely controllable vibrator of that kind is already known from GB 2 331 928 A. In this known vibrator a radio signal, which is transmitted by way of a radio transmission path to the vibrator, is emitted by selection of a telephone number individually associated with the vibrator. This has a microchip which activates a resonator as a reaction to the said radio signal. The duration of the activation of the resonator is predetermined and was input beforehand by the user by means of a control unit of the vibrator.

In addition, there is known from DE 201 10 298 U1 an acoustic dildo which has means for storage of melodies as well as a miniature loudspeaker for reproducing these melodies.

SUMMARY OF THE INVENTION

The invention has the object of improving the controllability of a vibrator.

This object is fulfilled by a remotely controllable vibrator with the features according to the invention. Advantageous embodiments and developments of the invention are discussed below, including a device for remote control of a vibrator.

The advantages of the invention consist particularly in that a vibrator is activatable not only by remote control, but that by means of the remote control signals supplied to the vibrator the mode of operation of the vibrator is controllable in various ways. For example, control commands can be fed to a vibrator by way of its Bluetooth interface, which selectively vary the intensity of the vibrations, and control commands which influence the duration of the vibrations. Moreover, remote programming commands can be fed to a vibrator by way of its Bluetooth interface, which serve for programming or reprogramming the vibrator. In addition, a bidirectional signal transmission can take place by way of the Bluetooth interface.

An advantageous embodiment of the invention consists in storing several working programs in a working program memory of the vibrator and selecting one of these working programs by means of the control commands fed to the vibrator by way of its Bluetooth interface.

If three resonators are provided in the vibrator, the directions of vibration of which are perpendicular to one another, the vibratory behaviour of the vibrator can be influenced in various ways in that one or more of the resonators can be selectively controlled by means of the remote control commands fed to the vibrator by way of its Bluetooth interface, for example controlled in the sense of an amplification of the vibrations and/or influencing of the duration of the vibrations.

A further advantage of the invention consists in transmitting response or acknowledgement signals to the second Bluetooth apparatus by way of the Bluetooth interface of the vibrator in the sense of a bidirectional signal transmission. These can be, for example, signals which were picked up by a microphone of the vibrator or signals which are derived from the audio signal memory of the vibrator or signals which were generated by the microcontroller of the vibrator. If the second Bluetooth apparatus is a mobile telephone, then the response signals can optionally be reproduced by way of the loudspeaker thereof.

An advantageous development of the invention consists in generating the control signals for the vibrator in a third apparatus, for example a further mobile telephone, and supplying them to the second Bluetooth apparatus, which can similarly be a mobile telephone, by way of a wire-free telephone connection. The second Bluetooth apparatus is provided with a memory in which identifying signals for one or more authorised third apparatus are stored. The second Bluetooth apparatus checks whether the received signals originate from an authorised third apparatus and passes on the received signals to the vibrator by way of the Bluetooth connection only if they originate from an authorised third apparatus.

BRIEF DESCRIPTION OF THE DRAWING

Further advantageous characteristics of the invention are evident from the following explanation of examples of embodiment by reference to the FIGURE. This shows a block circuit diagram in which components, which are necessary for an understanding of the invention, of a vibrator or a device for remote control of a vibrator are illustrated.

DETAILED DESCRIPTION OF PREFERRED EMBODIMENTS

The vibrator 1 comprises a microcontroller 2 as central control element. This produces control signals for a resonator device, to which resonators 3, 4 and 5 belong. The directions of vibration of these resonators are perpendicular to one another. Each of these resonators is separately controllable by the microcontroller 2 so that the strength and duration of the vibration is individually controllable for each of the resonators.

In addition, the illustrated vibrator 1 comprises a working program memory 6, in which one or more vibrator working programs are stored, and an audio signal memory 7. Moreover, the vibrator 1 is provided with a microphone 8, a loudspeaker 9, a Bluetooth interface 10, a battery 11, a first Bluetooth identifying number memory 12*a* and a second Bluetooth identifying number memory 12*b*. The first Bluetooth identifying number memory 12*a* is provided for storage of the own Bluetooth identifying number of the vibrator, which was already filed in the memory 12*a* at the factory at the time of manufacture of the vibrator. The second Bluetooth identifying number memory 12*b* is provided for storage of the Bluetooth identifying number of a further Bluetooth apparatus, with which a Bluetooth communication takes place. In the case of the illustrated example of embodiment the Bluetooth identifying number of a mobile telephone 20, with which the vibrator 1 is connected by way of the Bluetooth connection BT, is stored in the memory 12*b*. The storage of the Bluetooth identifying number of the further Bluetooth apparatus can similarly be carried out already at the factory, but can also be undertaken within the scope of the first making contact with the apparatus.

The vibrator 1 is remotely controllable by means of the further Bluetooth apparatus, particularly a mobile telephone 20. For example, control commands can be emitted by the mobile telephone, which influence the strength and duration of the vibrations of the resonators 3, 4, 5 of the vibrator. Moreover, the mobile telephone 20 can also be used as a programming tool for the vibrator, which transmits to the vibrator programming commands which serve for setting up or modification of a vibrator working program and are stored in the working program memory 6 of the vibrator.

The mobile telephone 20 comprises, as central control unit, a microcontroller 22 connected with a Bluetooth interface 29 of the mobile telephone. In addition, the microcontroller 22 receives inputs from a control keyboard 23 which is provided inter alia for input of control and program commands for the vibrator 1. Furthermore, the microcontroller 22 is connected with a microphone 27, a loudspeaker 28 and memories 24*a*, 24*b*, 25 and 26.

The memory 24*a* serves for storage of the Bluetooth identifying number of the mobile telephone, which is transmitted, in the case of each signal emitted by the mobile telephone by way of the Bluetooth interface, additionally to the actual signal content in order to make possible for the receiver of the Bluetooth signal an identification of the transmitter of the Bluetooth signal. Moreover, the Bluetooth identifying number of the vibrator 1 is stored in the memory 24*b* so that the mobile telephone is also in a position of checking the identity of the vibrator 1 when this transmits signals to the mobile telephone by way of the Bluetooth connection BT.

The memory 25 of the mobile telephone is a working program memory. One or more authorisation numbers are stored in the memory 26 of the mobile telephone. Each of these authorisation numbers identifies a third apparatus which is authorised, just like the mobile telephone 20, for the purpose of delivering remote control signals or remote programming signals for the vibrator 1. For example, these authorisation numbers are the telephone numbers of one or more further mobile telephones.

A further mobile telephone of that kind is denoted in the figure by the reference numeral 30. It comprises an antenna 31, a central control unit 32, a control keyboard 33, a microphone 34, a loudspeaker 35 and a working program memory 36. This further mobile telephone 30 can, through selection of the number of the mobile telephone 20, take up contact therewith by way of a telephone connection T.

The mode of operation of the illustrated device is described in more detail in the following.

The microcontroller 2 of the vibrator undertakes control of the resonators 3, 4, 5 in dependence on a working program stored in the working program memory 6 of the vibrator. This working program, which was stored in the working program memory 6 in the form of suitable software already by the manufacturer of the vibrator, is read out of the working program memory 6 as a reaction to a start command from the microcontroller 2 and used for control of the resonators. This start command is generated in the mobile telephone 20 and fed by way of the Bluetooth interface 29 thereof, the wire-free Bluetooth connection BT and the Bluetooth interface 10 of the vibrator to the microcontroller 2. Wire-free signals are transmissible by way of the Bluetooth connection BT over a distance of up to 10 meters so that attention has to be given to the mobile telephone 20 and the vibrator 1 remaining within this distance range.

Several vibrator working programs can also be stored in the working program memory 6 of the vibrator, of which one is selected by means of the remote control command produced by the Bluetooth apparatus 20. The different working programs can be distinguished from one another by, for example, different strengths of the vibrations, by different durations of the vibrations, by an activation or deactivation of the microphone 8, by an activation or deactivation of the loudspeaker 9 and by switching free or blocking predetermined remote control signals on the part of the microcontroller 2.

An advantageous embodiment of the invention consists in also transmitting programming signals to the vibrator 1 by means of the second Bluetooth apparatus 20 via the Bluetooth connection BT. A working program of the vibrator can be created or an already present working program modified by means of these programming signals, which are stored in the working program memory 6. This creation of a working program or modification of a working program can take place in the sense of an interactive user guide in which the dialogue signals produced by the microcontroller 2 are represented on a display of the mobile telephone.

All signals transmitted to the vibrator 1 from the mobile telephone 20 by way of the Bluetooth connection BT comprise, apart from the actual signal content, also the Bluetooth identifying number of the mobile telephone 20. The microcontroller 2 recognises on the basis of this Bluetooth identifying number that the received signal originates from the associated mobile 20 and passes on the actual signal content in the form of control signals to the resonator device 3, 4, 5 or—if a programming command is concerned—to the working program memory 6.

The received signals can be remote control commands by means of which the strength of the vibrations of the resonators or the duration of the vibrations of the resonators is influenced. Moreover, the received signals can be a selection command by means of which one of the working programs stored in the working program memory is selected and converted by the microcontroller 2 into control commands for the resonators 3, 4 and 5. The received signals can moreover—as was already mentioned—be a programming command which is supplied to the working program memory 6 of the vibrator 1.

The microcontroller 2 is furthermore provided for the purpose of making available acknowledgement or response signals which are transmitted by way of the Bluetooth interface 10 of the Bluetooth connection BT to the mobile telephone. These acknowledgement or response signals can be signals which were received by the microphone 8, signals which were derived from the audio signal memory 7 or signals which were generated by the microcontroller 2 itself, for example in the sense of a program dialogue or in the sense of a transmission of a charging state signal for the battery 11.

In accordance with the afore-described form of embodiment a mobile telephone, which has a Bluetooth interface, is accordingly used for the purpose of transmitting wire-free control and/or programming commands by way of a bidirectional Bluetooth connection to a vibrator similarly provided with a Bluetooth interface. The vibrator 1 is provided with a microcontroller 2 which is in a position of sending back acknowledgement or response signals to the mobile telephone 20.

An advantageous form of embodiment of the invention consists in equipping the vibrator 1 additionally with an on/off button (reset/standby) and a red/green luminescent diode and using an inductively chargeable battery as the battery 11. A charging process taking place is indicated by a slow red flashing of the luminescent diode. The vibrator 1 is switched into the standby mode by this charging. The vibrator 1 is brought into the operating mode by actuation of the on/off button.

After switching on of the operating mode the vibrator 1 is recognisable for a period of 90 seconds by other Bluetooth apparatus. This time duration is indicated by a rapid green flashing of the luminescent diode. During this time a connection between the mobile telephone 20 and the vibrator 1 can be produced at the mobile telephone. In order to produce a permanent association between the mobile telephone and the vibrator, the identification number of the vibrator is input at the mobile telephone. After 90 seconds the rapidly flashing green luminescent diode extinguishes. After extinction of the green luminescent diode, mobile telephone and vibrator can enter into a connection. An existing connection is indicated by a permanent lighting up of the green luminescent diode.

A connection of that kind between these two apparatus can be produced again at any time without renewed input of the identification number. This can take place in that the vibrator after being switched on automatically seeks the mobile telephone. Alternatively thereto a connection to the vibrator can be produced at the mobile telephone by actuation of a button. The possibility also exists of giving the user a selection possibility which the user may wish to have of the two aforementioned possibilities of establishing a connection.

An advantageous development of the invention consists in producing the remote control or remote programming signals for the vibrator 1 in a third apparatus 30, which is preferably a further mobile telephone. This comprises an antenna 31, a central control unit 32, a control keyboard 33, a microphone 34, a loudspeaker 35 and a working program memory 36.

In order to prevent any random third apparatus 30 from being able to remotely control or remotely program the vibrator 1 there is provided in the mobile telephone 20 an identifying signal memory 26. In this there is stored an identifying signal for any third apparatus 30 which is authorised for the purpose of remotely controlling or remotely programming the vibrator 1. For example, this identifying signal, which is stored in the identifying signal memory 26, is the telephone number of the or each authorised third apparatus 30.

If the telephone number of the mobile telephone 20 is selected by means of the mobile telephone 30, a telephone connection T is established between the two mobile telephones. The mobile telephone 20 recognises that the calling mobile telephone is an authorised third apparatus. If by means of the mobile telephone 30 after establishing of a telephone connection remote control or remote programming commands for the vibrator are transmitted to the mobile telephone 20, these are passed on by the mobile telephone 20 together with the Bluetooth identifying number of the mobile telephone by way of the Bluetooth interface 29, the Bluetooth connection BT and the Bluetooth interface 10 of the vibrator to the microcontroller 2 of the vibrator. This then looks after the desired further processing of the signals in the vibrator.

If, thereagainst, the signals received by the mobile telephone 20 originate from a non-authorised transmitter, they are not passed on to the vibrator 1.

The advantage of the afore-described form of embodiment consists in that the remote control or remote programming of the vibrator can take place from any desired location from which a wire-free or wire-connected link to the mobile telephone 20 can be established. It is merely necessary to ensure that the physical distance between the mobile telephone 20 and the vibrator 1 is not greater than the maximum range width of the Bluetooth connection employed.

Another advantageous development of the invention consists in additionally equipping the vibrator 1 with a temperature sensor which is connected with the microcontroller 2. This allows detection and recording of data relating to the monthly cycle of a woman. These data can be transmitted by way of the Bluetooth connection BT to the mobile telephone 20 and represented on the display thereof. This transmission of data preferably takes place when by means of the keyboard of the mobile telephone an appropriate call-up command is input which by way of the microcontroller 22 of the mobile telephone, the Bluetooth interface 29 thereof, the Bluetooth connection BT and the Bluetooth interface 10 of the vibrator 1 is supplied to the microcontroller 2 of the vibrator. In this development, data concerning the body of the woman is detected by means of the vibrator, transmitted by way of the Bluetooth connection to an external Bluetooth apparatus and represented on the display thereof.

In the case of the afore-described forms of embodiment of the invention mobile telephones were used as generators for the remote control or remote programming signals. Alternatively thereto, however, also other electronic apparatus can be used for remote control or remote programming of the vibrator, for example personal computers, notebooks, remote control transmitters for electronic entertainment apparatus, organisers, an own Bluetooth remote control of the vibrator, etc. In that case there can also come into use techniques or transmission methods which operate in the sense of the DTMF, SMS or Data-Call technology.

If the SMS technique is used, then when, for example, an SMS arrives this is signalled to the vibrator of the mobile telephone. The vibrator reads the SMS, evaluates it and in a given case cancels it. The authorisation of the SMS to control the vibrator can be checked by way of the call number of the sender of the SMS or by way of an access code at the start of the SMS. Since SMS communications coming from the Internet or from foreign countries do not have a sender call number, a check with use of an access code is preferred in accordance with the current state of the art.

If a data connection is used, then when, for example, a data call enters the mobile telephone this is signalled to the vibrator by the mobile telephone. The microcontroller of the vibrator decides whether or not it accepts the call. If the call is accepted, then the arriving data are evaluated in the vibrator. The authorisation for control of the vibrator can take place either by way of the call number of the caller or by way of a log-in procedure according to the call acceptance.

If a telephone connection is used, then when a telephone call enters a mobile telephone this is signalled to the vibrator by the mobile telephone. The microcontroller of the vibrator decides whether or not it accepts the call. If the call is accepted, then the arriving data are evaluated in the vibrator. The authorisation for controlling the vibrator can be checked either by way of the call number of the caller or by way of a log-in procedure after the call acceptance. The data transmission takes place way of DTMF tones. For evaluation of DTMF tones of that kind in the vibrator this has an additional chip.

In the case of these last-described forms of embodiment the means for checking the authorisation for controlling the vibrator, particularly an identifying signal memory and an evaluating unit, are disposed, by contrast to the example of embodiment shown in the figure, in the vibrator 1 itself and not in the mobile telephone 20.

In the afore-described forms of embodiment of the invention it was assumed that three resonators are provided in the vibrator, the directions of vibration of which are perpendicular to one another. Alternatively thereto it is also possible to use another number of resonators. Another alternative consists in using resonators having directions of vibration which are not perpendicular to one another.

In summary, it is to be noted with the invention that the apparatus directly communicating with the vibrator is, just like the vibrator, a Bluetooth apparatus, that between the vibrator and the further Bluetooth apparatus a Bluetooth connection exists and that an optionally present further apparatus is contacted with the further Bluetooth apparatus without a line or by way of a line.

A significant advantage of the invention consists that a comprehensive remote control and/or remote program of a vibrator can be realised economically since chips operating in accordance with the Bluetooth standard are available on the market favourably in price.

REFERENCE NUMERAL LIST

1 vibrator
2 microcontroller
3 first resonator
4 second resonator
5 third resonator
6 working program memory
7 audio signal memory
8 microphone
9 loudspeaker
10 Bluetooth interface
11 battery
12*a* Bluetooth identifying number memory
12*b* Bluetooth identifying number memory
20 first mobile telephone
21 antenna
22 microcontroller
23 keyboard
24*a* Bluetooth identifying number memory
24*b* Bluetooth identifying number memory
25 working program memory
26 identifying signal memory
27 microphone
28 loudspeaker
29 Bluetooth interface
30 second mobile telephone
31 antenna
32 microcontroller
33 keyboard
34 microphone
35 loudspeaker
36 working program memory
BT Bluetooth connection
T telephone connection

The invention claimed is:

1. Remotely controllable vibrator, which comprises a receiver interface, a microcontroller connected with the receiver interface to receive signals comprising a Bluetooth identifying number and command signals, a Bluetooth identifying memory (12*b*) for storage of the Bluetooth identifying number of an external Bluetooth apparatus, and a resonator device controlled by the microcontroller, wherein the receiver interface (10) is a Bluetooth interface suitable for a bidirectional wire-free signal transmission between the vibrator (1) and the external Bluetooth apparatus (20) and the microcontroller compares the received Bluetooth identifying number with the stored Bluetooth identifying number and if the received Bluetooth identifying number is the same as the stored Bluetooth identifying number, then the microcontroller is enabled to pass on actual command signal content of the received signals because the received Bluetooth identifying number corresponds to the stored Bluetooth identifying number of the external Bluetooth apparatus.

2. Remotely controllable vibrator according to claim 1, wherein the resonator device comprises three resonators, the directions of vibration of which are perpendicular relative to one another.

3. Remotely controllable vibrator according to claim 1, comprising a microphone (8), signals derived from the microphone being made available to the Bluetooth interface (10).

4. Remotely controllable vibrator according to claim 1, wherein it comprises a loudspeaker (9) by means of which signals stored in an audio signal memory (7) of the vibrator and audio signals received by way of the Bluetooth interface (10) are reproducible.

5. Remotely controllable vibrator according to claim 1, comprising a contactlessly chargeable battery (11).

6. Remotely controllable vibrator according to claim 1, wherein the actual command signal content of the received signals influences strength of vibrations of resonators of the resonator device or duration of vibrations of resonators of the resonator device or is a selection command via which one of a plurality of working programs stored in a working program memory is selected and converted by the microcontroller into control commands for resonators of the resonator device or is a programming command supplied to a working program memory.

7. Device for remote control of a vibrator, comprising:

(a) a vibrator (1) comprising a receiver interface (10), a microcontroller (2) connected with the receiver interface and a resonator device (3, 4, 5) controlled by the microcontroller, wherein the receiver interface is a Bluetooth interface suitable for a bidirectional wire-free signal transmission between the vibrator (1) and an external Bluetooth apparatus (20);

(b) a second Bluetooth apparatus (20), wherein the second Bluetooth apparatus is provided for generating a transmission signal comprising a Bluetooth identifying number and command signals for the vibrator, the command signals being remote control signals or remote programming signals for the vibrator (1); and (c) a Bluetooth identifying memory (12*b*) provided in the vibrator for storage of the Bluetooth identifying number of the second Bluetooth apparatus;

and the microcontroller compares the received Bluetooth identifying number with the stored Bluetooth identifying number and if the received Bluetooth identifying number is the same as the stored Bluetooth identifying number, then the microcontroller is enabled to pass on actual command signal content of signals received from the second Bluetooth apparatus because the Bluetooth identifying number received by the microcontroller corresponds to the stored Bluetooth identifying number of the second Bluetooth apparatus.

8. Device according to claim 7, wherein the resonator device comprises three resonators, the directions of vibration of which are perpendicular to one another.

9. Device according to claim 7, wherein the vibrator comprises a microphone (8) and signals derived from the microphone are made available to the Bluetooth interface (10).

10. Device according to claim 7, wherein the vibrator comprises a loudspeaker (9) by means of which signals stored in an audio signal memory (7) of the vibrator and audio signals received by way of the Bluetooth interface (10) are reproducible.

11. Device according to claim 7, wherein the vibrator comprises a contactlessly chargeable battery (11).

12. Device according to claim 7, wherein the second Bluetooth apparatus (20) is a mobile telephone, a personal computer, a remote control transmitter, a notebook or an organizer.

13. Device according to claim 7, comprising a third apparatus (30) connected with the second Bluetooth apparatus (20) without a line or by way of a line and that the third apparatus (30) generates remote control signals for the vibrator (1), which are transmissible by way of the second Bluetooth apparatus (20) to the Bluetooth interface (10) of the vibrator (1).

14. Device according to claim 13, wherein the second Bluetooth apparatus (20) comprises an identifying signal memory (27) provided for storage of an identifying signal for an authorized third apparatus and the second Bluetooth apparatus (20) passes on control signals to the vibrator (1) only when these derive from an authorized third apparatus (30).

15. Device according to claim 7, wherein the vibrator comprises measuring means for detection of data derived from a human body and the second Bluetooth apparatus comprises reproducing means serving for reproducing signals corresponding with this data.

16. Device for remote control of a vibrator according to claim 7, wherein the actual command signal content of the received signals influences strength of vibrations of resonators of the resonator device or duration of vibrations of resonators of the resonator device or is a selection command via which one of a plurality of working programs stored in a working program memory is selected and converted by the microcontroller into control commands for resonators of the resonator device or is a programming command supplied to a working program memory.

17. Remotely controllable vibrator, which comprises a receiver interface, a microcontroller connected with the receiver interface to receive signals comprising a Bluetooth identifying number and command signals, a Bluetooth identifying memory (12*b*) for storage of the Bluetooth identifying number of an external Bluetooth apparatus, and a resonator device controlled by the microcontroller, wherein the receiver interface (10) is a Bluetooth interface suitable for a bidirectional wire-free signal transmission between the vibrator (1) and the external Bluetooth apparatus (20) and the microcontroller compares the received Bluetooth identifying number with the stored Bluetooth identifying number and if the received Bluetooth identifying number is the same as the stored Bluetooth identifying number, then the microcontroller is enabled to pass on actual command signal content of the received signals because the received Bluetooth identifying number corresponds to the stored Bluetooth identifying number of the external Bluetooth apparatus, wherein the actual command signal content of the received signals influences strength and duration of vibrations of resonators of the resonator device.

18. Remotely controllable vibrator, which comprises a receiver interface, a microcontroller connected with the receiver interface to receive signals comprising a Bluetooth identifying number and command signals, a Bluetooth identifying memory (12*b*) for storage of the Bluetooth identifying number of an external Bluetooth apparatus, and a resonator device controlled by the microcontroller, wherein the receiver interface (10) is a Bluetooth interface suitable for a bidirectional wire-free signal transmission between the vibrator (1) and the external Bluetooth apparatus (20) and the microcontroller compares the received Bluetooth identifying number with the stored Bluetooth identifying number and if the received Bluetooth identifying number is the same as the stored Bluetooth identifying number, and the actual command signal content of the received signals is a selection command via which one of a plurality of working programs stored in a working program memory is selected and the microcontroller converts the selected working program into control commands for resonators of the resonator device.

19. Remotely controllable vibrator, which comprises a receiver interface, a microcontroller connected with the receiver interface to receive signals comprising a Bluetooth identifying number and command signals, a Bluetooth identifying memory (12*b*) for storage of the Bluetooth identifying number of an external Bluetooth apparatus, and a resonator device controlled by the microcontroller, wherein the receiver interface (10) is a Bluetooth interface suitable for a bidirectional wire-free signal transmission between the vibrator (1) and the external Bluetooth apparatus (20) and the microcontroller compares the received Bluetooth identifying number with the stored Bluetooth identifying number and if the received Bluetooth identifying number is the same as the stored Bluetooth identifying number; and the actual command signal content of the received signals is a programming command and the microcontroller passes on the programming command to a working program memory of the vibrator.

20. Device for remote control of a vibrator, comprising:

(a) a vibrator (1) comprising a receiver interface (10), a microcontroller (2) connected with the receiver interface and a resonator device (3, 4, 5) controlled by the microcontroller, wherein the receiver interface is a Bluetooth interface suitable for a bidirectional wire-free signal transmission between the vibrator (1) and an external Bluetooth apparatus (20);

(b) a second Bluetooth apparatus (20), wherein the second Bluetooth apparatus is provided for generating a transmission signal comprising a Bluetooth identifying number and command signals for the vibrator, the command signals being remote control signals for the vibrator (1); and (c) a Bluetooth identifying memory (12*b*) provided in the vibrator for storage of the Bluetooth identifying number of the second Bluetooth apparatus;

and the microcontroller compares the received Bluetooth identifying number with the stored Bluetooth identifying number and if the received Bluetooth identifying number is the same as the stored Bluetooth identifying number, then the microcontroller is enabled to pass on actual command signal content of the transmission signal received from the second Bluetooth apparatus because the Bluetooth identifying number received by the microcontroller corresponds to the stored Bluetooth identifying number of the second Bluetooth apparatus, wherein the actual command signal content of the transmission signal influences strength and duration of vibrations of resonators of the resonator device.

21. Device for remote control of a vibrator, comprising:

(a) a vibrator (1) comprising a receiver interface (10), a microcontroller (2) connected with the receiver interface and a resonator device (3, 4, 5) controlled by the microcontroller, wherein the receiver interface is a Bluetooth interface suitable for a bidirectional wire-free signal transmission between the vibrator (1) and an external Bluetooth apparatus (20);

(b) a second Bluetooth apparatus (20), wherein the second Bluetooth apparatus is provided for generating a transmission signal comprising a Bluetooth identifying number and command signals for the vibrator, the command signals being remote control signals for the vibrator (1); and (c) a Bluetooth identifying memory (12*b*) provided in the vibrator for storage of the Bluetooth identifying number of the second Bluetooth apparatus;

and the microcontroller compares the received Bluetooth identifying number with the stored Bluetooth identifying number and if the received Bluetooth identifying number is the same as the stored Bluetooth identifying number, and the actual command signal content of the transmission signal is a selection command via which one of a plurality of working programs stored in a working program memory is selected and the microcontroller converts the selected working program into control commands for resonators of the resonator device.

22. Device for remote control of a vibrator, comprising:

(a) a vibrator (1) comprising a receiver interface (10), a microcontroller (2) connected with the receiver interface and a resonator device (3, 4, 5) controlled by the microcontroller, wherein the receiver interface is a Bluetooth interface suitable for a bidirectional wire-free signal transmission between the vibrator (1) and an external Bluetooth apparatus (20);

(b) a second Bluetooth apparatus (20), wherein the second Bluetooth apparatus is provided for generating a transmission signal comprising a Bluetooth identifying number and command signals for the vibrator, the command signals being remote programming signals for the vibrator (1); and (c) a Bluetooth identifying memory (12*b*) provided in the vibrator for storage of the Bluetooth identifying number of the second Bluetooth apparatus;

and the microcontroller compares the received Bluetooth identifying number with the stored Bluetooth identifying number and if the received Bluetooth identifying number is the same as the stored Bluetooth identifying number, and the actual command signal content of the transmission signal is a programming command and the microcontroller passes on the programming command to a working program memory of the vibrator.

* * * * *

UNITED STATES PATENT AND TRADEMARK OFFICE

CERTIFICATE OF CORRECTION

PATENT NO. : 7,643,795 B2
APPLICATION NO. : 10/502483
DATED : January 5, 2010
INVENTOR(S) : Friedrichs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this

Sixteenth Day of November, 2010

David J. Kappos
*Director of the United States Patent and Trademark Office*